United States Patent
Newcomb et al.

(10) Patent No.: US 10,637,321 B1
(45) Date of Patent: Apr. 28, 2020

(54) MOTOR HOUSINGS AND MOTOR ASSEMBLIES WITH CONTROLLED RADIAL THERMAL EXPANSION

(71) Applicant: GM GLOBAL TECHNOLOGY OPERATIONS LLC, Detroit, MI (US)

(72) Inventors: Bradley A. Newcomb, Troy, MI (US); Song He, Troy, MI (US); Seongchan Pack, West Bloomfield, MI (US); Sean R. Wagner, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 16/213,082

(22) Filed: Dec. 7, 2018

(51) Int. Cl.
*H02K 5/02* (2006.01)
*H02K 15/14* (2006.01)

(52) U.S. Cl.
CPC ............ *H02K 5/02* (2013.01); *H02K 15/14* (2013.01)

(58) Field of Classification Search
CPC .............. H02K 5/02; H02K 5/04; H02K 5/14
USPC ................................. 310/89; 220/645, 648
See application file for complete search history.

(56) References Cited

U.S. PATENT DOCUMENTS

| | | | | |
|---|---|---|---|---|
| 3,501,047 A | * | 3/1970 | Raabe | B65D 21/0209 220/648 |
| 3,969,812 A | * | 7/1976 | Beck | B21D 51/24 29/421.1 |
| 4,113,132 A | * | 9/1978 | Steiner | B65H 65/00 138/153 |
| 4,544,428 A | | 10/1985 | Mandel | |
| 4,997,125 A | * | 3/1991 | Glerum | B65D 3/22 220/62.11 |
| 7,834,509 B2 | | 11/2010 | Legros et al. | |
| 9,843,237 B2 | | 12/2017 | Kalev et al. | |
| 10,280,974 B2 | * | 5/2019 | Newcomb | B32B 15/00 |
| 2005/0217950 A1 | | 10/2005 | Jolley, Jr. et al. | |
| 2006/0226724 A1 | | 10/2006 | Cullen et al. | |
| 2013/0033136 A1 | | 2/2013 | McMullen | |

FOREIGN PATENT DOCUMENTS

| | | | |
|---|---|---|---|
| CN | 101145725 B | * | 9/2010 |
| CN | 101145725 B | | 9/2010 |
| JP | H05280531 A | | 10/1993 |

(Continued)

OTHER PUBLICATIONS

Unpublished U.S. Appl. No. 15/661,242.

*Primary Examiner* — Burton S Mullins

(57) ABSTRACT

Motor housings with controlled radial thermal expansion include a cylindrical body with at least one circumferential groove extending inward from an outer surface of the cylindrical body, and a fiber composite band disposed within each groove. The grooves can be dovetail shaped and extend inward from the outer surface of the cylindrical body to a groove bottom, wherein each groove has a first width at the outer surface and a second width at the groove bottom that is greater than the first width. Methods for controlling radial thermal expansion of motor housings include providing a motor housing including a cylindrical aluminum body with a plurality of circumferential grooves extending inward from an outer surface of the cylindrical body, disposing a plurality of continuous fibers within the grooves, applying a matrix to the continuous fibers, and curing the matrix to form a fiber composite band within the grooves.

20 Claims, 2 Drawing Sheets

(56) References Cited

FOREIGN PATENT DOCUMENTS

JP 3290737 B2 6/2002
JP 2004304980 A 10/2004

* cited by examiner

MOTOR HOUSINGS AND MOTOR ASSEMBLIES WITH CONTROLLED RADIAL THERMAL EXPANSION

INTRODUCTION

Assembled structures may include components made of various different shapes and materials. The individual components may respond differently to heating, and in assemblies such as those where different rates of expansion are undesirable, accounting for those different rates is needed. One way to address the differential thermal expansion is to account for the differences in the assembly's design tolerances, which are implemented when fabricating the individual components. This approach may be of limited effectiveness such as when the expansion rate results in the creation of gaps between components.

SUMMARY

Motor housings are provided and include a cylindrical body with at least one circumferential groove extending inward from an outer surface of the cylindrical body, and a fiber composite band disposed within each of the at least one circumferential grooves. Each of the at least one fiber composite bands exhibits a first coefficient of linear thermal expansion (CLTE), and the cylindrical body exhibits a second CLTE which is higher than the first CLTE. The at least one fiber composite bands can each include a plurality of continuous fibers imbedded in a cured matrix. The continuous fibers can be imbedded in the cured matrix under tension. The matrix can include one or more of epoxy, polycaprolactam, poly[imino(1,6-dioxohexamethylene) iminohexamethylene], polyetheretherketone, phenol formaldehyde resin, polyphenylene sulfide, polypropylene, and bismaleimide. The fibers can include carbon, graphite, glass, aramid, basalt, polyethylene, and combinations thereof. The cylindrical body can include aluminum and/or magnesium. Each of the at least one grooves can be dovetail shaped and extend inward from the outer surface of the cylindrical body to a groove bottom, wherein each of the at least one grooves have a first width at the outer surface and a second width at the groove bottom that is greater than the first width.

Motor assemblies are provided, and include a motor housing, and a motor disposed within the motor housing. The motor housing can include a cylindrical aluminum and/or magnesium body with a plurality of circumferential grooves extending inward from an outer surface of the cylindrical body, and a fiber composite band disposed within each of the plurality of circumferential grooves. Each of the at least one fiber composite bands can exhibit a first coefficient of linear thermal expansion (CLTE), and the cylindrical body can exhibit a second CLTE which is higher than the first CLTE. Each of the fiber composite bands can include continuous fibers imbedded in a cured matrix. The continuous fibers can be imbedded in the cured matrix under tension. The matrix can include one or more of epoxy, polycaprolactam, poly[imino(1,6-dioxohexamethylene) iminohexamethylene], polyetheretherketone, phenol formaldehyde resin, polyphenylene sulfide, polypropylene, and bismaleimide. The fibers can include carbon, graphite, glass, aramid, basalt, polyethylene, and combinations thereof. Each of the plurality of grooves can be dovetail shaped and extend inward from the outer surface of the cylindrical body to a groove bottom, wherein each of the plurality of grooves have a first width at the outer surface and a second width at the groove bottom that is greater than the first width. The motor can include a rotor and a stator, and the stator is shrink-fit into the motor housing.

Methods for controlling radial thermal expansion of aluminum and/or magnesium motor housings are provided. The methods include providing a motor housing including a cylindrical aluminum and/or magnesium body with a plurality of circumferential grooves extending inward from an outer surface of the cylindrical body, disposing a plurality of continuous fibers within one or more of the grooves, applying a matrix to the continuous fibers, and curing the matrix to form a fiber composite band within one or more of the grooves. Each of the plurality of grooves can be dovetail shaped and extend inward from the outer surface of the cylindrical body to a groove bottom, wherein each of the plurality of grooves have a first width at the outer surface and a second width at the groove bottom that is greater than the first width. Disposing the plurality of continuous fibers within one or more of the grooves can include disposing the continuous fibers in the grooves under tension prior to curing the matrix. Each of the plurality of fiber composite bands can exhibit a first coefficient of linear thermal expansion (CLTE), and the cylindrical body can exhibit a second CLTE which is higher than the first CLTE. The tension of the continuous fibers of a respective fiber composite band can be controlled to tune the CLTE of the fiber composite band.

Other objects, advantages and novel features of the exemplary embodiments will become more apparent from the following detailed description of exemplary embodiments and the accompanying drawings.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material in the related art has not been described in detail in order to avoid unnecessarily obscuring the disclosure. Furthermore, the drawings are in simplified form and are not to precise scale. For purposes of convenience and clarity, directional terms may be used with respect to the drawings. These and similar directional terms are not to be construed to limit the scope of the disclosure. Furthermore, the disclosure, as illustrated and described herein, may be practiced in the absence of an element which is not specifically disclosed herein.

Provided herein are methods for controlling radial thermal expansion of motor housings, and motor housings exhibiting minimal or no radial thermal expansion. Such motor housings comprise composite bands which exhibit a different coefficient of linear thermal expansion (CLTE) than the motor housing body. Accordingly, the following description relates to structures and methods for controlling thermal expansion and retention.

Figure 1:
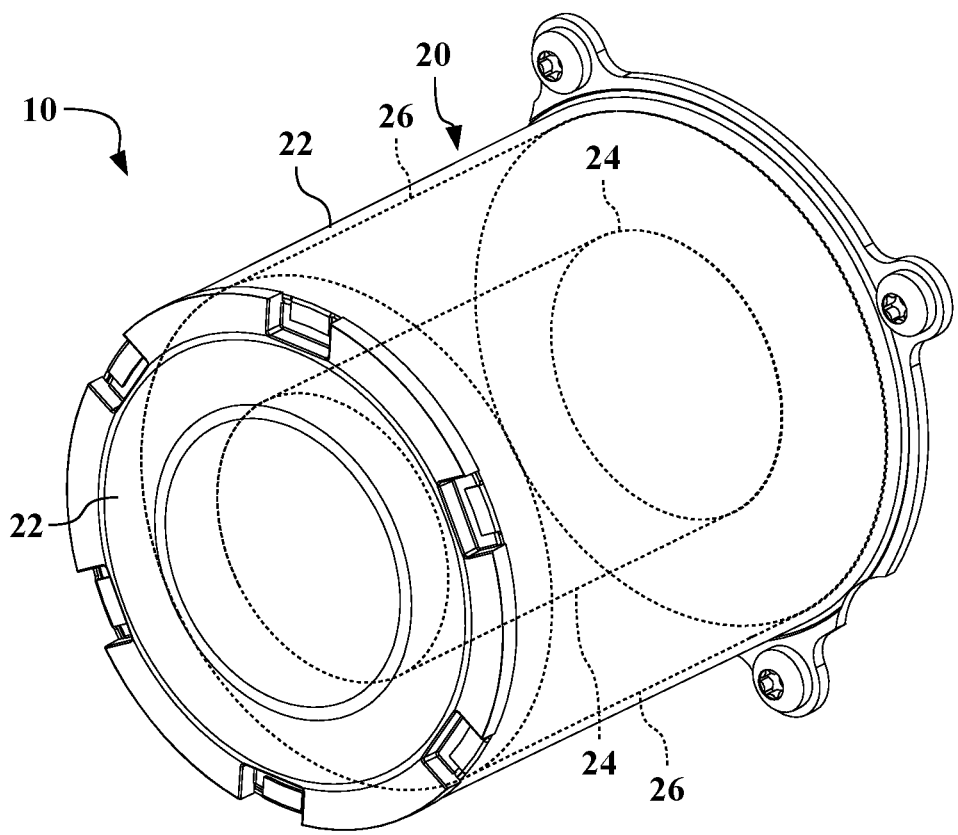
FIG. 1 illustrates a schematic isometric view of a motor assembly, according to one or more embodiments.

FIG. 1 illustrates a schematic isometric view of a motor assembly 10, showing some of the interior components in phantom. The motor assembly 10 includes a motor 20 disposed substantially within a cylindrical motor housing 22. The motor 20 includes a rotor 24 and a stator 26 (both of which are hidden from view by the motor housing 22 and are schematically shown with phantom lines). The stator 26 can be press-fit, or shrink-fit, into the motor housing 22, for example. The cylindrical motor housing 22 can comprise a material with a modulus of less than 450 GPa and a CLTE greater than 0 ppm/K. For example, the cylindrical motor housing 22 can comprise aluminum and aluminum alloys, an/or magnesium and magnesium alloys, for example. Electromagnetic forces are converted into a rotational force by the interaction between the rotor 24 and the stator 26, causing a shaft mounting (not shown) on the rotor 24 to rotate. The induction heat generated from the interaction between the rotor 24 and the stator 26 causes expansion of the motor housing 22, particularly in a radially outward direction. Additionally, shrink-fitting the stator 26 into the motor housing 22 can cause undesirable thermal expansion of the motor housing 22.

Figure 2:
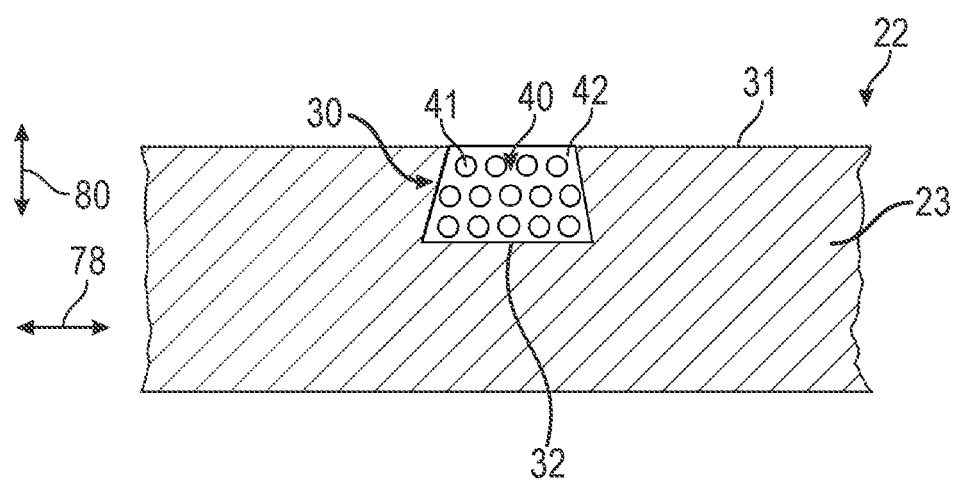
FIG. 2 illustrates a cross-sectional schematic side view of the motor housing, according to one or more embodiments.
Figure 3:
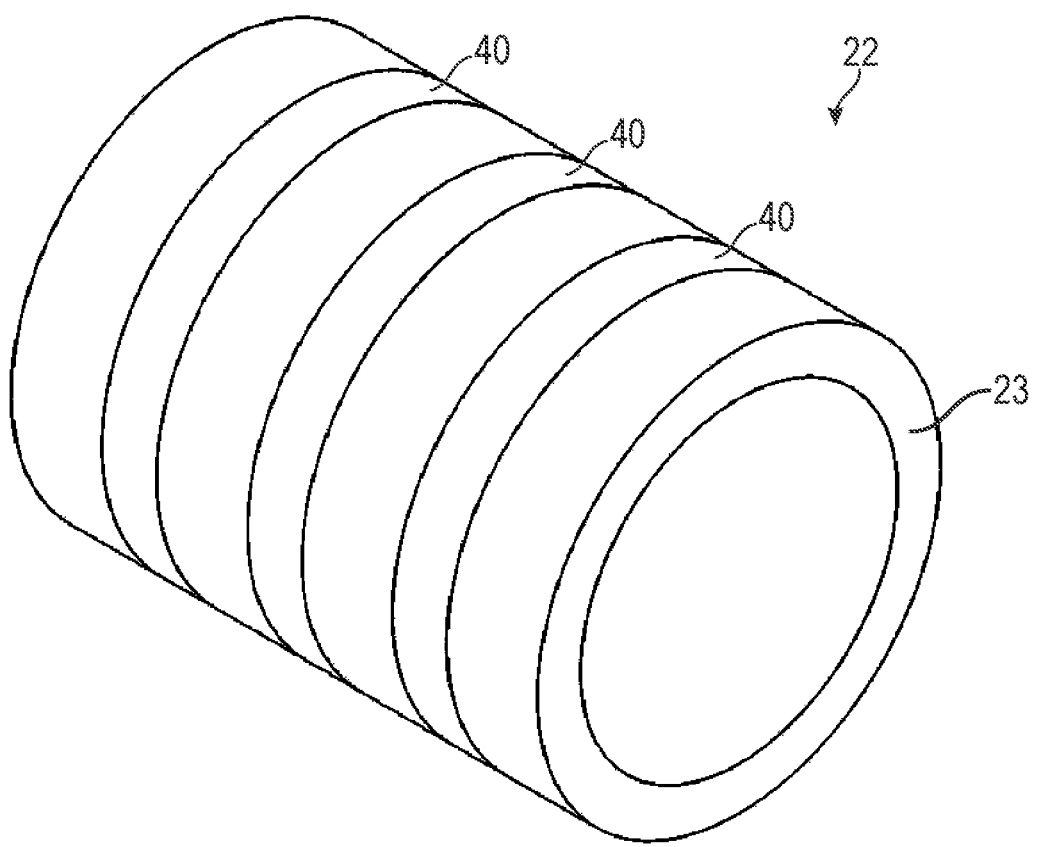
FIG. 3 illustrates a perspective view of a motor housing, according to one or more embodiments.

FIG. 2 illustrates a cross-sectional schematic side view of the motor housing 22. FIG. 3 illustrates a perspective view of the motor housing 22. The motor housing 22 comprises a cylindrical body 23 with at least one circumferential groove 30 extending inward from an outer surface 31 of the cylindrical body 23. A fiber composite band 40 is disposed within each of the at least one circumferential grooves 30. The fiber composite band 40 exhibits a first CLTE, and the cylindrical body 23 of the motor housing 22 exhibits a second CLTE which is higher than the first CLTE. Accordingly, the one or more fiber composite bands 40 prevent or minimize the radial thermal expansion of the motor housing 22. A radial direction 80 is defined perpendicular to the axial direction 78. Optionally, each of the at least one grooves 30 are dovetail shaped. In other words, the grooves 30 have a first width at the outer surface 31 and a second width at the groove bottom 32. Such dovetail-shaped grooves 30 mechanically lock with the respective fiber composite band 40 disposed therein, and particularly prevent separation of the fiber composite band 40 from the cylindrical body 23 while the latter contracts radially inward, such as during cooling.

The fiber composite band 40 comprises a plurality of fibers 41 imbedded in a cured matrix 42. The plurality of fibers 41 can be continuous fibers which extend around the full circumference of the groove 30, in some embodiments. The fibers 41 can comprise one or more materials exhibiting high stiffness and low thermal expansion. The fibers 41 can comprise carbon, graphite, glass, aramid (e.g., para-aramid, meta-aramid), basalt, Polyethylene (e.g., ultra-high-molecular-weight polyethylene (UHMWPE)), and combinations thereof.

The cured matrix 42 can comprise resins or polymers such as a thermoset or thermoplastic. Example polymers include, but are not limited to: Acrylonitrile butadiene styrene (ABS), Polymethyl Methacrylate (PMMA), Celluloid, Cellulose acetate, Cycloolefin Copolymer (COC), Benzoxazine, Bis-Maleimides (BMI), Cyanate esters, Epoxy, Ethylene-Vinyl Acetate (EVA), Ethylene vinyl alcohol (EVOH), Fluoroplastics (including PTFE, FEP, PFA, CTFE, ECTFE, ETFE), phenol formaldehyde resins (PF), Polyacetal (POM or Acetal), Polyacrylates (Acrylic), Polyacrylonitrile (PAN or Acrylonitrile), Polyamide (PA), Polycaprolactam, Polyamide-imide (PAI), Polyaryletherketone (PAEK or Ketone), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxyalkanoates (PHAs), Polyketone (PK), Polyester, Polyetheretherketone (PEEK), Polyetherketoneketone (PEKK), Polyetherimide (PEI), Polyethersulfone (PES), Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), polycarbonate+acrylonitrile butadiene styrene mix (ABS+PC), Polypropylene (PP), Polyethylene (PE), unsaturated Polyester, Vinyl ester, Silicone, or combinations or blends in any amount thereof, or may be another type. In some embodiments, the cured matrix 42 can comprise one or more of epoxy, polycaprolactam, poly[imino(1,6-dioxohexamethylene) iminohexamethylene], polyetheretherketone, phenol formaldehyde resin, polyphenylene sulfide, polypropylene, polyurethane, and bis-maleimides.

In one embodiment, the fiber composite bands 40 can comprise carbon fibers and an epoxy matrix, wherein the carbon fibers comprise about 45 volume % ("v %") to about 85 v %, or about 50 v % to about 80 v % of the fiber composite bands 40. In one embodiment, the fiber composite bands 40 can comprise carbon fibers and a PA (e.g., Poly[imino(1,6-dioxohexamethylene) iminohexamethylene]) matrix, wherein the carbon fibers comprise about 45 v % to about 85 v %, or about 50 v % to about 80 v % of the fiber composite bands 40. In one embodiment, the fiber composite bands 40 can comprise carbon fibers and a PEEK matrix, wherein the carbon fibers comprise about 45 v % to about 85 v %, or about 50 v % to about 80 v % of the fiber composite bands 40. In one embodiment, the fiber composite bands 40 can comprise carbon fibers and a PF matrix, wherein the carbon fibers comprise about 45 v % to about 85 v %, or about 50 v % to about 80 v % of the fiber composite bands 40. In one embodiment, the fiber composite bands 40 can comprise carbon fibers and a polycaprolactam matrix, wherein the carbon fibers comprise about 45 v % to about 85 v %, or about 50 v % to about 80 v % of the fiber composite bands 40.

The one or more fiber composite bands 40 can be formed by disposing a plurality of the fibers 41 within a groove 30, applying a matrix 42 to the fibers 41, and curing the matrix 42 to form the fiber composite band 40. In other words, the fibers 41 can be disposed within the groove 30 either dry, after being wetted or infused with the uncured matrix 42, in a pre-impregnated form, or may be applied in another form. The uncured matrix 42 can comprise an uncured thermosetting resin or a thermoplastic above its melting temperature, for example. In some embodiments, the fibers 41 are continuous fibers and are imbedded in the cured matrix 42 under tension. By varying the tension of the fibers 41, the CLTE of fiber composite band 40 can be tuned to achieve a desired expansion performance of the motor housing 22.

Accordingly, methods for controlling radial thermal expansion of metal motor housings, 22 comprise providing metal motor housing 22, disposing a plurality of continuous fibers 41 within one or more of the grooves 30 of the motor housing 22; applying a matrix 42 to the continuous fibers 41, and curing the matrix 42 to form a fiber composite band 40 within one or more of the plurality of grooves 30. As used herein, "curing" refers to traditional curing as well as general solidification of materials such as thermosets and thermoplastics. As described above, order is not imputed upon the steps of the described method, and therefore the matrix can be applied to the continuous fibers 41 at various stages, including before or after the continuous fibers 41 are disposed with the one or more grooves 30. As described above, the methods can further comprise disposing the continuous fibers 41 in the grooves 30 under tension prior to curing the matrix 42. In such embodiments, the tension of the continuous fibers 41 of a respective fiber composite band 40 can be controlled to tune the CLTE of the fiber composite band 40.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A motor housing comprising:
   a cylindrical body with at least one circumferential groove extending inward from an outer surface of the cylindrical body; and
   a fiber composite band disposed within each of the at least one circumferential grooves;
   wherein each of the at least one fiber composite bands exhibits a first coefficient of linear thermal expansion (CLTE), and the cylindrical body exhibits a second CLTE which is higher than the first CLTE.

2. The motor housing of claim 1, wherein the at least one fiber composite bands each comprise a plurality of continuous fibers imbedded in a cured matrix.

3. The motor housing of claim 2, wherein the continuous fibers are imbedded in the cured matrix under tension.

4. The motor housing of claim 2, wherein the matrix comprises one or more of epoxy, polycaprolactam, poly[imino(1,6-dioxohexamethylene) iminohexamethylene], polyetheretherketone, phenol formaldehyde resin, polyphenylene sulfide, polypropylene, polyurethane, and bis-maleimide.

5. The motor housing of claim 2, wherein the fibers comprise carbon, graphite, glass, aramid, basalt, polyethylene, and combinations thereof.

6. The motor housing of claim 1, wherein the cylindrical body comprises aluminum and/or magnesium.

7. The motor housing of claim 1, wherein each of the at least one grooves are dovetail shaped and extend inward from the outer surface of the cylindrical body to a groove bottom, wherein each of the at least one grooves have a first width at the outer surface and a second width at the groove bottom that is greater than the first width.

8. A motor assembly comprising:
   a motor housing including:
      a cylindrical aluminum and/or magnesium body with a plurality of circumferential grooves extending inward from an outer surface of the cylindrical body, and
      a fiber composite band disposed within each of the plurality of circumferential grooves; and
   a motor disposed within the motor housing.

9. The motor assembly of claim 8, wherein each of the at least one fiber composite bands exhibits a first coefficient of linear thermal expansion (CLTE), and the cylindrical body exhibits a second CLTE which is higher than the first CLTE.

10. The motor assembly of claim 8, wherein each of the fiber composite bands comprise continuous fibers imbedded in a cured matrix.

11. The motor assembly of claim 10, wherein the continuous fibers are imbedded in the cured matrix under tension.

12. The motor assembly of claim 10, wherein the matrix comprises one or more of epoxy, polycaprolactam, poly[imino(1,6-dioxohexamethylene) iminohexamethylene], polyetheretherketone, phenol formaldehyde resin, polyphenylene sulfide, polypropylene, polyurethane, and bis-maleimide.

13. The motor assembly of claim 10, wherein the fibers comprise carbon, graphite, glass, aramid, basalt, polyethylene, and combinations thereof.

14. The motor assembly of claim 8, wherein each of the plurality of grooves are dovetail shaped and extend inward from the outer surface of the cylindrical body to a groove bottom, wherein each of the plurality of grooves have a first width at the outer surface and a second width at the groove bottom that is greater than the first width.

15. The motor assembly of claim 8, wherein the motor comprises a rotor and a stator, and the stator is shrink-fit into the motor housing.

16. A method for controlling radial thermal expansion of aluminum and/or magnesium motor housings, the method comprising:
   providing a motor housing including a cylindrical aluminum and/or magnesium body with a plurality of circumferential grooves extending inward from an outer surface of the cylindrical body;
   disposing a plurality of continuous fibers within one or more of the grooves;
   applying a matrix to the continuous fibers; and
   curing the matrix to form a fiber composite band within one or more of the grooves.

17. The method of claim 16, wherein each of the plurality of grooves are dovetail shaped and extend inward from the outer surface of the cylindrical body to a groove bottom, wherein each of the plurality of grooves have a first width at the outer surface and a second width at the groove bottom that is greater than the first width.

18. The method of claim 16, wherein disposing the plurality of continuous fibers within one or more of the grooves comprises disposing the continuous fibers in the grooves under tension prior to curing the matrix.

19. The method of claim 16, wherein each of the plurality of fiber composite bands exhibits a first coefficient of linear thermal expansion (CLTE), and the cylindrical body exhibits a second CLTE which is higher than the first CLTE.

20. The method of claim 19, wherein the tension of the continuous fibers of a respective fiber composite band is controlled to tune the CLTE of the fiber composite band.

* * * * *